United States Patent [19]
Suzuki

[11] Patent Number: 5,671,016
[45] Date of Patent: Sep. 23, 1997

[54] HIGH VOLTAGE DISCHARGE CIRCUIT FOR CRT

[75] Inventor: Hirotsugu Suzuki, Daito, Japan

[73] Assignee: Funai Electric Co., Ltd., Osaka, Japan

[21] Appl. No.: 374,062

[22] Filed: Jan. 13, 1995

[30] Foreign Application Priority Data

Jan. 13, 1994 [JP] Japan ................................. 6-014822

[51] Int. Cl.⁶ .................................................. H04N 5/68
[52] U.S. Cl. ............................ 348/377; 348/378; 348/380
[58] Field of Search .................................. 348/377–378, 348/173, 380; H04N 3/20, 5/68

[56] References Cited

U.S. PATENT DOCUMENTS 5,184,225 2/1993 Heidebroek ............................ 348/173

Primary Examiner—Sherrie Hsia
Attorney, Agent, or Firm—Bacon & Thomas

[57] ABSTRACT

In a high voltage discharge circuit for a CRT, a power-off detecting circuit detects turning off of a power switch and outputs a power-off detection signal, to activate a luminance increasing section to increase the luminance of a video signal being outputted to the CRT at the time the power switch is turned off. Therefore, the high-voltage charges that remain applied between the anode and the cathode of the CRT after the power switch has been turned off discharge rapidly so that occurrence of afterglow can be reliably prevented.

6 Claims, 2 Drawing Sheets

5,671,016

HIGH VOLTAGE DISCHARGE CIRCUIT FOR CRT

BACKGROUND OF THE INVENTION

The invention relates to a high voltage discharge circuit for a cathode-ray tube (CRT) which can rapidly eliminate afterglow caused by electronic beam in the CRT when, e.g., a television receiver is turned off.

FIG. 2 is a circuit diagram showing a configuration of a conventional video output circuit in a television receiver. In FIG. 2, reference numeral 1 designates a CRT; 2, an anode of a display screen to which a high voltage is applied; 3, a high voltage rectifying circuit section; and 4, a flyback transformer for generating a high-frequency high voltage from a DC voltage based on a horizontal synchronizing pulse signal. Here, an AC power is supplied to an AC rectifying circuit 22 through a switch 23 for the entire television receiver, rectified into a DC power supply voltage at a DC power supply circuit 21 that is designed to stabilize the output of the AC rectifying circuit 22, and fed to the flyback transformer 4 through a switch 30. Reference numeral 15 designates a power-off detecting circuit that detects turning off of the power switch of the television receiver and outputs a power-off detection signal. The switch 30 is turned on and off by the power-off detecting circuit 15. Reference numeral 5 designates a cathode of the CRT 1, which represents only one of three cathodes provided for the primary colors red (R), green (G), and blue (B).

Reference numeral 20 designates a color signal processing circuit for the CRT 1. The color signal processing circuit 20 includes: a resistor 6 inserted into the cathode circuit; a transistor 7 to which a color difference signal is supplied; a resistor 9 connected to the collector of the transistor 7; and a luminance adjusting circuit 10 that is a parallel circuit consisting of a capacitor and a resistor.

Reference numeral 12 designates a television signal processing circuit section; 8, a video amplifying transistor that receives a luminance signal outputted from a luminance signal terminal 12a of the television signal processing circuit section 12; and 11, a resistor connected to the collector of the video amplifying transistor 8. The output of the video amplifying transistor 8 is connected to the luminance adjusting circuit 10. In addition, a color signal terminal 12b of the television signal processing circuit section 12 is connected to the color signal processing circuit 20.

The television receiver having the thus configured video output circuit is operated as follows. When a not shown button for power-off is pressed, the application of various DC power supply voltages to the television signal processing circuitry excluding a backup circuit, is stopped, so that the operation of the television receiver is temporarily stopped (in a stand-by state). Due to inconsistent drops in the various power supply voltages, or due to inconsistencies in the characteristics of the CRT 1, a high voltage remains applied between the anode 2 and the cathode 5 of the CRT 1 if the switch 30 remains closed. That is, the high-voltage charges are left applied, which in turn leaves a high electric field applied across the anode 2 and the cathode 5. As a result, an electronic beam current of some µA flows in small quantities under this state, causing the fluorescent surface of the anode 2 to emit light for a few seconds. That is, afterglow, which is a phenomenon characterized by the luminous spot remaining on the CRT screen, occurs.

Therefore, to control the phenomenon of afterglow, an attempt has been made in the conventional example to cause the power-off detecting circuit 15 to turn off the switch 30 at the time the power switch is turned off.

However, this attempt in the conventional example has not been a perfect solution to the problem of afterglow.

SUMMARY OF THE INVENTION

The invention has been made to overcome the aforementioned problem. Accordingly, an object of the invention is to provide a high voltage discharge circuit that can reliably prevent occurrence of afterglow at the time the power switch is turned off.

To achieve the above object, the invention provides a high voltage discharge circuit for a CRT including: power-off detecting means for detecting turning off of a power switch of an output circuit to the CRT; and luminance increasing means for increasing the luminance of a picture on the CRT when the power switch is turned off based on a power-off detection signal outputted from the power-off detecting means.

DETAILED DESCRIPTION OF THE PREFERRED EMBODIMENT

Figure 1:
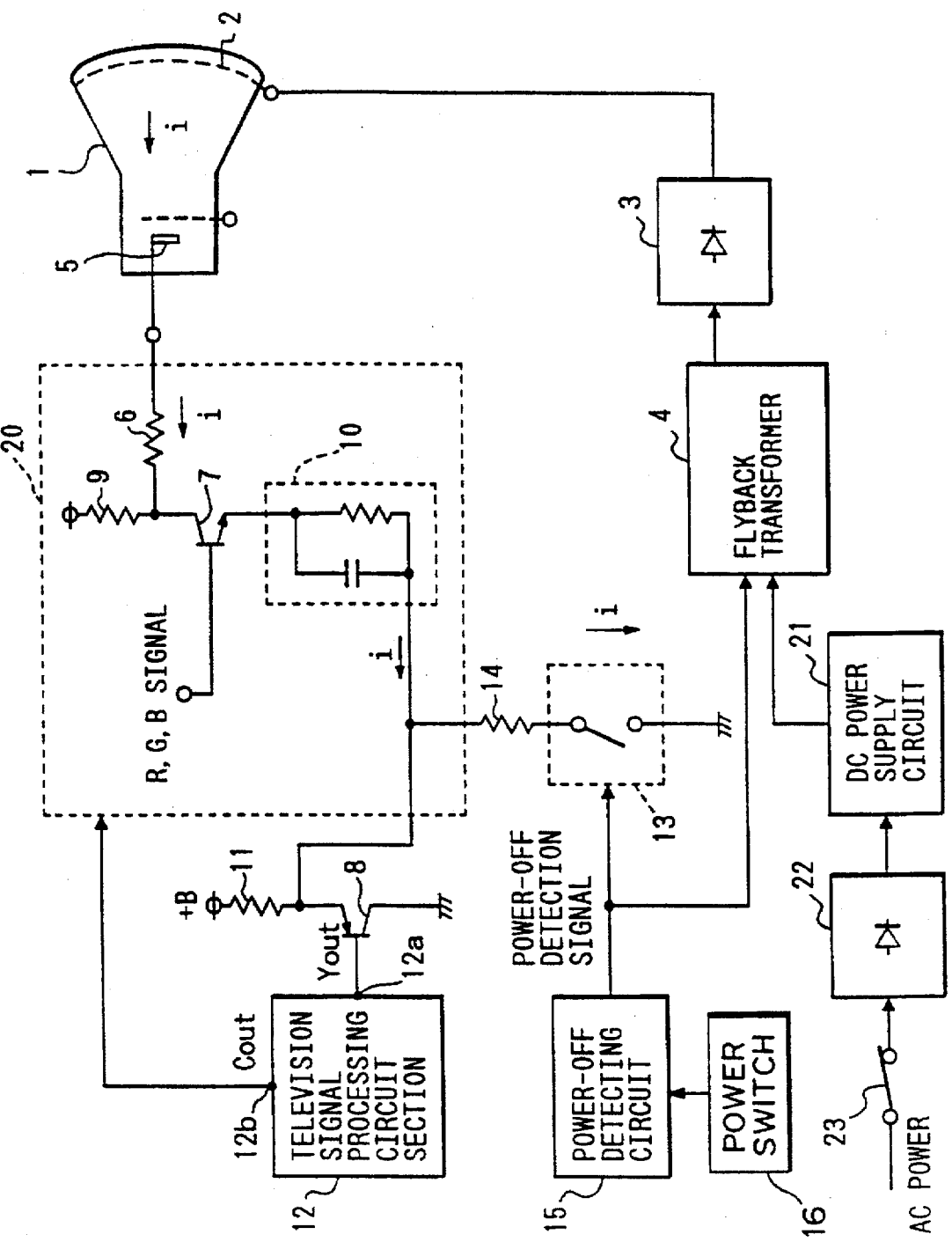
FIG. 1 is a circuit diagram showing a configuration of a video output circuit having a high voltage discharge circuit for a CRT, which is an embodiment of the invention.

An embodiment of the invention will now be described with reference to the drawing.

FIG. 1 is a circuit diagram showing a configuration of a video output circuit having a high voltage discharge circuit for a CRT, which is the embodiment of the invention.

Figure 2:
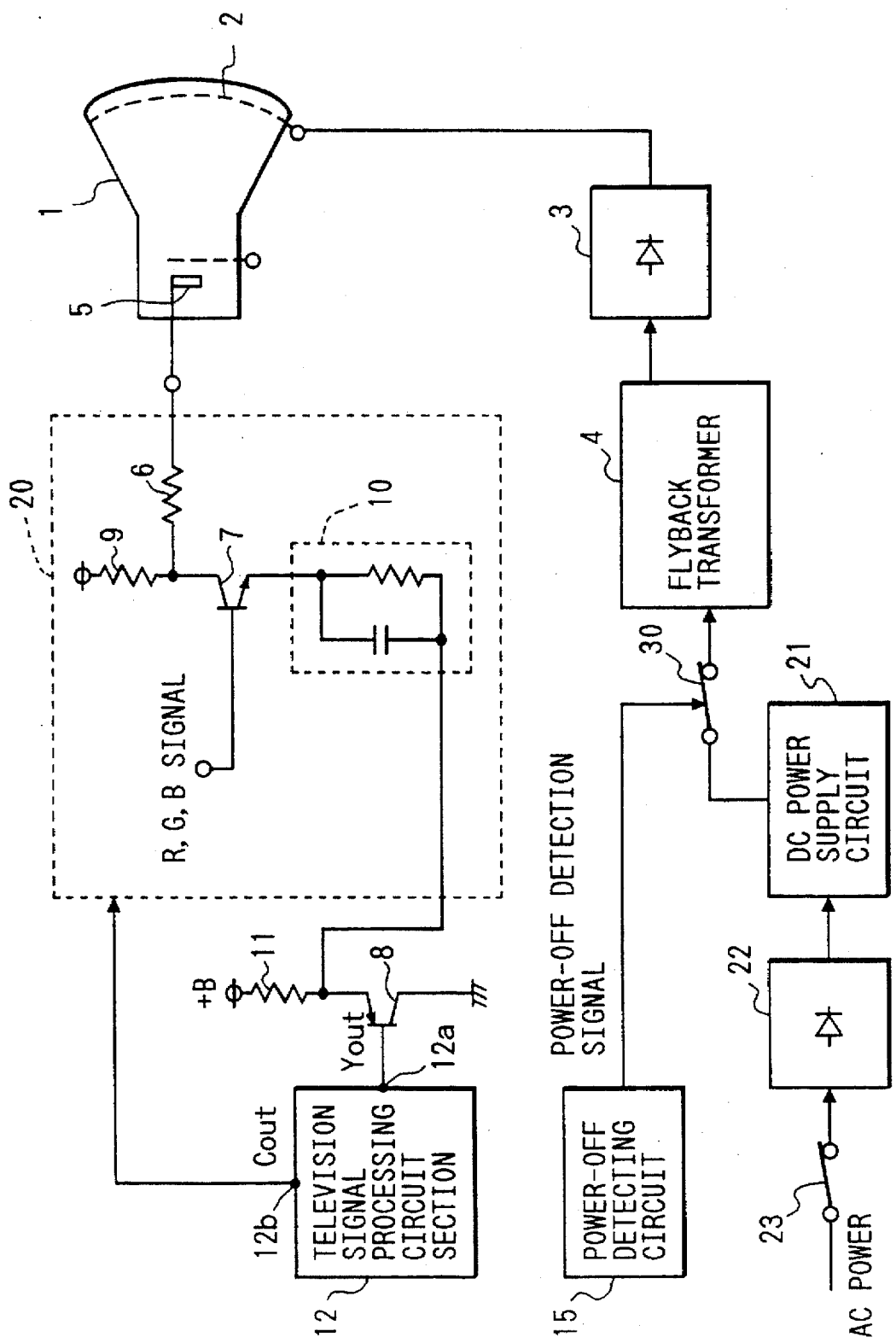
FIG. 2 is a circuit diagram showing a configuration of a conventional video output circuit having no high voltage discharge circuit for a CRT.

In FIG. 1, the same or like parts and components as those in FIG. 2 are designated by the same reference numerals, and the descriptions thereof will be omitted.

In FIG. 1, reference numeral 13 designates a switch circuit such as a semiconductor switch circuit. This switch is turned on by a power-off detection signal.

Reference numeral 14 designates a resistor interposed between the switch circuit 13 and the emitter of a video amplifying transistor 8; and 15, a power-off detecting circuit that detects turning off of the television receiver and outputs the power-off detection signal.

The power-off detecting circuit 15 may be implemented by any circuit, either a circuit implemented by software in a microcomputer constituting a control circuit for controlling the entire operation of the television receiver, or a circuit including devices such as a transistor, a capacitor, and a resistor.

A mode of operation of the high voltage discharge circuit for a CRT will be described.

When power switch 16 is turned off, the power-off detecting circuit 15 detects the turning off of the power switch.

Upon detection of the turning off of the power switch, the power-off detecting circuit 15 outputs the power-off detection signal to both the switch circuit 13 and a flyback transformer 4.

The switch circuit 13 is turned on by the power-off detection signal, and grounds the emitter of the video amplifying transistor 8 through a resistor 14. The power-off detection signal also stops oscillation of the flyback transformer 4.

As a result, a luminance signal is forcibly controlled to a low potential rapidly upon turning off of the power switch (the luminance of a picture on the CRT screen is increased), which in turn causes a high-voltage current $i$ to instantaneously flow in a transient state in which the power switch is turned off, and this causes high-voltage charges that remain applied between an anode 2 and a cathode 5 of a CRT 1 to discharge.

That is, as shown in FIG. 1, the electric charges stored in the anode 2 discharge to the cathode 5, and the discharge current $i$ passes through a resistor 6, then passes through a luminance adjusting circuit 10, and passes through the switch circuit 13 to the ground.

Therefore, the high-voltage charges left applied between the anode 2 and the cathode 5 of the CRT 1 at the time of turning the power switch off rapidly discharge, thereby eliminating afterglow remaining on the CRT screen within a very short period of time.

While the luminance of the picture on the CRT screen is increased by decreasing the potential of the emitter of the transistor 8 at the time the power switch is turned off in the aforementioned embodiment, the invention is not limited to this example. The luminance may be increased by decreasing the potential of the base of the transistor 8, or by increasing the brightness or contrast.

As described in the foregoing, the invention is characterized as increasing the luminance of a picture outputted to the CRT when the power switch is turned off. Therefore, the invention can provide the advantage of reliably preventing occurrence of afterglow.

What is claimed is:

1. A high voltage discharge circuit for a CRT comprising:
   means including a video amplifying transistor for receiving a luminance signal outputted by a luminance signal terminal of a television signal processing circuit;
   a video signal processing circuit including luminance adjusting means connected to the video amplifying transistor for adjusting a luminance of a picture on the CRT;
   power-off detecting means for detecting turning off of a power switch of a circuit for supplying power to the CRT; and
   luminance increasing means connected between said video amplifying transistor and said luminance adjusting means for increasing the luminance of the picture on the CRT when the power switch is turned off based on a power-off detection signal outputted from said power-off detecting means.

2. The high voltage discharge circuit according to claim 1, wherein said power-off detecting means includes a circuit implemented by software in a microcomputer.

3. The high voltage discharge circuit according to claim 1, wherein said luminance increasing means includes a switch circuit, which is turned on by the power-off detection signal from said power-off detecting means, for forcibly decreasing a potential of the luminance signal supplied to the CRT rapidly, thereby increasing the luminance of the picture on the CRT.

4. The high voltage discharge circuit according to claim 1, wherein said luminance increasing means increases brightness based on the power-off detection signal from said power-off detecting means, thereby increasing the luminance of the picture on the CRT.

5. The high voltage discharge circuit according to claim 1, wherein said luminance increasing means increases contrast based on the power-off detection signal from said power-off detecting means, thereby increasing the luminance of the picture on the CRT.

6. The high voltage discharge circuit according to claim 1, wherein the power-off detection signal from said power-off detecting means stops oscillation of a flyback transformer for the CRT.

* * * * *